Patented Mar. 3, 1925.

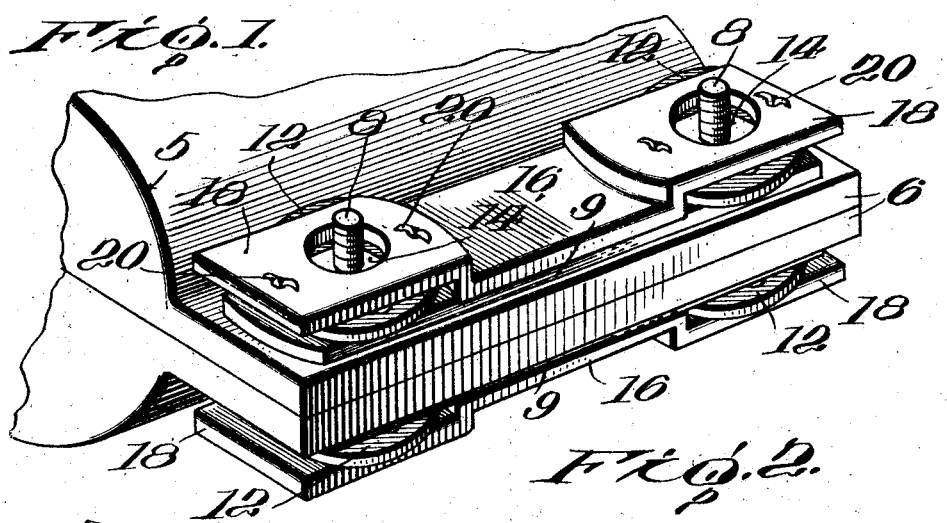
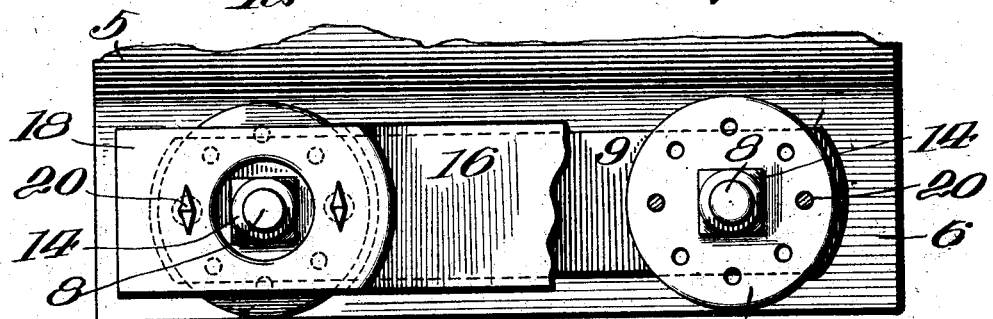
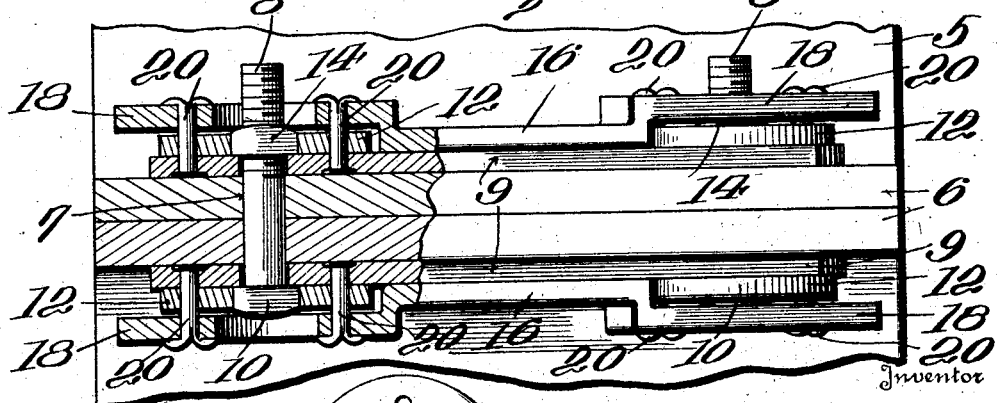
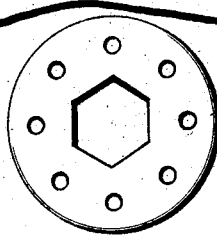

1,528,019

UNITED STATES PATENT OFFICE.

FRANK HEBEL, OF CHICAGO, ILLINOIS.

NUT LOCK.

Application filed June 19, 1924. Serial No. 721,057.

*To all whom it may concern:*

Be it known that I, FRANK HEBEL, a citizen of the United States, residing at Chicago, in the county of Cook and State of Illinois, have invented new and useful Improvements in Nut Locks, of which the following is a specification.

This invention relates to nut locks and more particularly to a means for locking a plurality of nuts on their respective bolts.

Briefly stated an important object of this invention is to provide a nut lock which may be conveniently applied to standard nuts and bolts without in any way interfering with the operation of the mechanism to which the bolts are applied and without the exercise of unusual skill.

A further object of the invention is to provide a nut lock of the character specified which is of highly simplified construction, durable in use and cheap to manufacture.

Other objects and advantages will be apparent during the course of the following description.

In the accompanying drawing forming a part of this application and in which like numerals are employed to designate like parts throughout the same, Figure 1 is a perspective of the improved nut lock in use;

Fig. 2 is a plan view of the same;

Fig. 3 is a side elevation, parts being shown in section;

Fig. 4 is a plan view of one form of locking ring embodied in the invention.

In the drawing wherein for the purpose of illustration is shown a preferred embodiment of the invention, the numeral 5 designates a two part body which may be in the nature of a journal box or the like and each part of the body is provided with lateral flanges 6 having openings 7 for the reception of bolts 8. The bolts 8 are also extended through connecting plates 9 applied to the outer surfaces of the flanges.

In carrying out the invention the head 10 of each bolt is snugly received in a centrally located opening in a locking ring 12. Figs. 1, 2 and 3 illustrate that the opening in each locking ring is four sided because the heads of the bolts are four sided and in case the head of the bolt is polygonal sided the openings are polygonal sided, this feature being illustrated in Fig. 4.

After the bolt has been extended through the flanges 6 a nut 14 is applied to the bolt and one of the locking rings 12 is applied as illustrated in Fig. 3. When the locking rings 12 have been applied a locking plate 16 is applied to the outer sides of the connecting plate 9 and the off set end portions 18 are arranged over the locking rings. It is important to note that the off set end portions 18 of the locking plates 16 are spaced from contact with the rings 12 so that the parts are prevented from rusting together. A free circulation of air is allowed between the rings 12 and the off set ends and consequently when it is desired to detach the locking plates 16 no difficulty is experienced because of the parts rusting. However, spacing of the portions 18 from the locking plates 16 is not actually necessary, and may be dispensed with.

The plates 9 and 16 and the rings 12 may be locked together by split rivets 20, the end portions of which may be bent over flatly into contact with the outer sides of the off set ends 18 as clearly illustrated in Fig. 3. This provides a quick convenient means for securing the parts together and also permits of the convenient disconnection of the locking plates and associated parts when desired.

Having thus described my invention, what is claimed is:

A nut lock comprising a connecting plate having bolt receiving openings, locking rings mounted on said connecting plate and having a series of apertures, and a locking plate having off set ends overhanging and protecting said rings and having apertures adapted for alinement with said first named apertures, and fastening devices extending through said connecting plate and through said first and second named apertures whereby to connect the locking plate, the rings and the connecting plate together, the off set end portions of said locking plate being parallel to and spaced from contact with said rings.

In testimony whereof I affix my signature.

FRANK HEBEL.